US006704355B1

United States Patent
Lai

(10) Patent No.: US 6,704,355 B1
(45) Date of Patent: *Mar. 9, 2004

(54) METHOD AND APPARATUS TO ENHANCE TIMING RECOVERY DURING LEVEL LEARNING IN A DATA COMMUNICATION SYSTEM

(75) Inventor: Yhean-Sen Lai, Warren, NJ (US)

(73) Assignee: Agere Systems INC, Alentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/537,462

(22) Filed: Mar. 27, 2000

(51) Int. Cl.[7] .............................. H03H 7/30; H03H 7/40; H03K 5/159
(52) U.S. Cl. ........................ 375/231; 375/229; 375/230; 375/232; 375/233
(58) Field of Search ................................ 375/233, 222, 375/231, 232; 708/323; 370/523

(56) References Cited

U.S. PATENT DOCUMENTS

| | | | | |
|---|---|---|---|---|
| 6,002,713 A | * | 12/1999 | Goldstein et al. | 375/222 |
| 6,115,395 A | * | 9/2000 | Norrell et al. | 370/523 |
| 6,185,250 B1 | * | 2/2001 | Wang et al. | 375/222 |
| 6,404,809 B1 | * | 6/2002 | Zhang | 375/232 |
| 6,459,729 B1 | * | 10/2002 | Lai | 375/231 |

* cited by examiner

Primary Examiner—Stephen Chin
Assistant Examiner—Curtis Odom
(74) Attorney, Agent, or Firm—J. De La Rosa

(57) ABSTRACT

A method and apparatus are disclosed for improving channel equalization and enhancing timing recovery during level learning in a data communication system. The disclosed equalizer training process separately updates the feed forward filter (FFF) and the level adapter, to gain additional improvements in the training of the feed forward filter (FFF). The multi-step equalizer training process initially trains the feed forward filter (FFF) using a two-level signal EQTR(n) having an ideal value to help converge the feed forward filter (FFF) to a certain level. Once the feed forward filter (FFF) reaches a certain level of convergence, the training circuitry is reconfigured to evaluate and update the actual level of the signal EQTR(n). The determined weighting factors are applied to a low pass filter and the actual level of the signal EQTR(n), B(n), is calculated. The actual level of the signal EQTR(n), B(n), is then applied to the level adapter.

24 Claims, 3 Drawing Sheets

METHOD AND APPARATUS TO ENHANCE TIMING RECOVERY DURING LEVEL LEARNING IN A DATA COMMUNICATION SYSTEM

FIELD OF THE INVENTION

The present invention relates to communications systems and methods, and more particularly to data communication systems and methods in which channel impairments are treated.

BACKGROUND OF THE INVENTION

It is well known that a pulse code modulation (PCM) modem can achieve higher speeds of data communication over a switched voice network compared to conventional modems. The basic concept underlying this communication technology is a public switched telephone network (PSTN) having digital links, such as T1 lines, which can form a basis for a near digital network of 64 kilo-bits-per-second (kb/s) channels. For example, by synchronizing a pulse code modulation (PCM) modem to an 8 kHz sampling rate provided in a central office (CO) and using 8-bit PCM words for data transmission, the modem can theoretically achieve a data rate up to 64 kb/s.

In practice, however, the highest data rate achievable by the PCM modem is about 56 kb/s, due to power constraints and channel impairments, such as echo and intersymbol interference. This rate may be further reduced as the central office periodically "robs" the least significant bit (LSB) of the PCM words and substitutes the robbed bit with a signaling bit, in a known manner. The robbed bit signaling is necessary to indicate call statuses to effect call administration in the PSTN. In robbed bit signaling, the central office (not shown) in the PSTN robs the LSB of a transmitted symbol on each channel once in every six frames.

To reduce echo interference in traditional voice communications, especially far echo interference due to a long-distance feedback of a voice signal through the PSTN, the level of the voice signal from the PSTN is attenuated in a central office switch before it is passed onto an analog loop connected to telephone equipment. Such attenuation by the central office switch is known as a "digital loss."

While the above-described robbed bit substitution does not cause significant distortion in voice communications, the robbing of bits causes significant degradation in data communications because of the loss of transmitted bits occasioned thereby. Similarly, while the above digital loss helps reduce the far echo interference in voice communications, digital loss causes the levels of transmitted signals representing data to be attenuated, resulting in erroneous data recovery in data communications if the digital loss is not taken into account in the PCM modem. Although the digital loss is built into each central office switch and the underlying attenuation factor is invariant for a given switch, this factor may vary from one switch to another depending on the type and manufacturer of the switch. As a result, a PCM modem that is preadjusted during manufacture thereof to allow for the digital loss by a particular type of switch may not function properly when connected to a different switch in the field.

As apparent from the above-described deficiencies with conventional data systems, a need exists for a data communication system having improved channel equalization and level learning. A further need exists for training the channel equalizer in a data communication system that utilizes the character of the digital network to optimize the performance of the channel equalizer. Yet another need exists for a data communication system that uses a two-level learning approach with fine-tuning to train the channel equalizer and with enhanced timing recovery and performance.

SUMMARY OF THE INVENTION

Generally, a method and apparatus are disclosed for improving channel equalization and enhancing level learning in a data communication system. According to one aspect of the invention, a multi-step equalizer training process is used to train the feed forward filer (FFF) using a two-level equalizer training signal, EQTR(n). The equalizer training process of the present invention separately updates the feed forward filer (FFF) and the level adapter, to gain additional improvements in the training of the feed forward filter (FFF). In addition, the improved training of the channel equalizer provided by the present invention allows a novel level learning process where the feed forward filter (FFF) is fixed.

The multi-step equalizer training process initially trains the feed forward filter (FFF) using a two-level equalizer training signal EQTR(n) having an ideal value (Step One). Step one helps to converge the feed forward filter (FFF) to a certain level. Once the feed forward filter (FFF) reaches a certain level of convergence, the training circuitry is reconfigured during step two for the equalizer training process, to evaluate and update the actual level of the signal EQTR(n), to compensate for the channel. The actual level of the signal EQTR(n) can be different from the ideal signal established during step one because the channel may have a digital loss or a robbed bit condition may have occurred. The level of all six phases is monitored during step two, and the amplitude of each phase if calculated. The determined weighting factors are applied to a low pass filter to reduce the noise and the actual level of the equalizer training signal EQTR(n), B(n), is calculated.

Once the actual level of the signal EQTR(n), B(n), has been calculated during step two of the equalizer training process, the actual level of the signal EQTR(n), B(n), is applied to the level adapter, and the level adapter is no longer updated by reconfiguring the training circuitry to remove the error signal, err(n), inputs to the level adapter. During step three, the feed forward filter (FFF) continues to be updated by the error signal, err(n). Since the level of the signal EQTR(n) is the actual value, B(n), the performance of the feed forward filter (FFF) is improved, even though robbed bit and digital loss degradations have occurred. Thus, step three trains the feed forward filter (FFF) is performed during step three, with the correct level that is disrupted by the robbed bit signaling. Once the equalizer training process is complete, the feed forward filter (FFF) is fixed. Thus, the fine-tuning step (Step 3) improves the equalizer training and reduces the number of computations that must be performed (MIPS) during the equalizer training process.

According to a second aspect of the invention, the improved training of the feed forward filter (FFF) allows the feed forward filter (FFF) to be fixed during the level learning process. Thus, the level learning process is simplified and can be implemented with fewer MIPS. The improved training of the feed forward filter (FFF) allows the structure of level learning process to be simplified, with the training circuitry removed and the feed forward filter (FFF) fixed, where each level will be divided into six phases and processed individually.

In addition, an input training signal sequence that employs pseudo random, non-zero, signals for each PCM level training is used to enhance the timing recovery and performance of the level learning process. In the past, zero input training signals have been employed in PCM level training. These zero training signals may degrade the timing tone and degrade the accuracy and overall performance of PCM modem communication. In contrast, in this invention, we employ a non-zero, training signal sequence for level training. It is then easy for a designer of ordinary skill in the art to generate a training signal sequence such that it could generate a strong timing tone at 8 kHz to stabilize the timing recovery during level learning. Stability of timing recovery during level learning helps improve the accuracy and overall performance of PCM modem communication.

A more complete understanding of the present invention, as well as further features and advantages of the present invention, will be obtained by reference to the following detailed description and drawings.

DETAILED DESCRIPTION OF THE INVENTION

Figure 1:
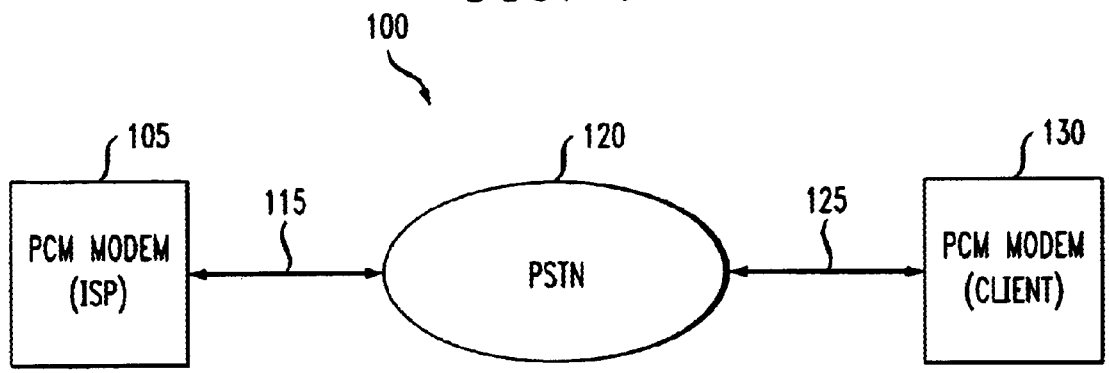
FIG. 1 illustrates a network communications environment in accordance with the present invention.

FIG. 1 illustrates a network communications environment 100 embodying principles of the present invention. As shown in FIG. 1, the network communications environment 100 includes a pulse code modulation (PCM) modem 105 connected to the public switched telephone network (PSTN) 120 by means of a digital link 115, such as a T1 line. Modem 105 may be employed, for example, by an Internet Service Provider (ISP) to communicate Internet data to a PCM modem 130 at a client site. The PCM modem 130 is discussed further below in conjunction with FIG. 2. Modem 130 may initiate a dial-up connection to modem 105 to access the Internet service. This dial-up connection includes an analog loop 125, connecting modem 130 to the PSTN 120.

In the illustrative embodiment, both modems 105, 130 are synchronized to an 8 kHz sampling rate provided by a conventional $\mu$-law codec: in a central office (not shown) in PSTN 120. The data communications between modems 105 and 130 are in the form of 8-bit PCM words, using the non-uniformly spaced quantization levels in accordance with the standard $\mu$-law companding as the signal alphabets or data symbols. PCM modem 105 transmits a signal representing data to the PCM modem 130 via an established dial-up connection. The transmitted signal is corrupted by channel impairments, such as intersymbol interference and echo. A conventional switch (not shown) in the central office attenuates the transmitted signal before it is passed onto the analog loop 125. Such attenuation by the central office switch is known as a "digital loss." The digital loss is traditionally imposed to reduce echo interference in voice communications, especially far echo interference due to a long-distance feedback of a voice signal through PSTN 120.

Figure 2:
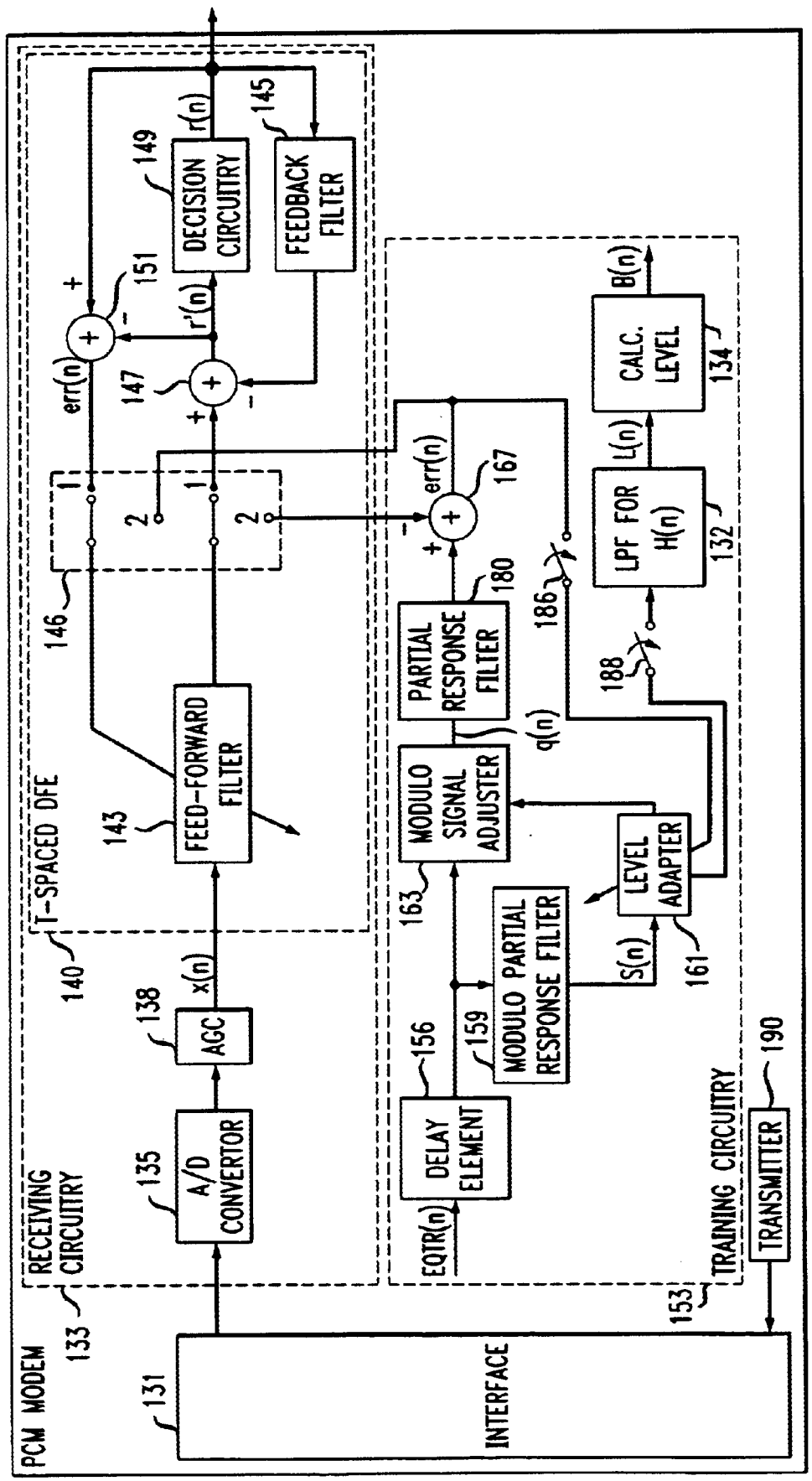
FIG. 2 illustrates the modem 130 of FIG. 1 in detail, including the receiving circuitry and training circuitry.

FIG. 2 illustrates the PCM modem 130 of FIG. 1 in further detail. The attenuated received signal, x(t), at time t from PSTN 120 has a spectrum spanning from DC to 4 kHz on the analog loop 125, and is received by standard interface 131. The received signal is then applied to an A/D convertor 135 of conventional design in receiving circuitry 133. Automatic gain control (AGC) circuitry 138 imparts a gain to the digital samples resulting from the A/D conversion. The amount of this gain is determined during an initial training of modem 130, in a known manner, to adjust the energy of the digital samples to a proper level. The gain-adjusted samples, denoted x(n), are illustratively processed by an adaptive T-spaced decision feedback equalizer (DFE) 140 of conventional design, where n=t/T, and T represents the symbol interval. However, it will be appreciated that a person skilled in the art may alternatively employ an adaptive fractionally-spaced DFE, such as a T/2-spaced DFE, instead of DFE 140. In a conventional manner, DFE 140 decides what PCM words were transmitted based on x(n), and uses past decisions to compensate for the undesirable intersymbol interference.

Specifically, DFE 140 includes feed-forward filter 143 and feedback filter 145, which may be finite impulse response (FIR) filters. Let N and K be the numbers of tap coefficients of filters 143 and 145, respectively, and $c_u$, and $p_v$, represent the coefficients of the respective filters, where $0 \leq u < N$ and $0 \leq v < K$. The coefficients, $p_v$, are pre-selected to achieve an impulse response of an equivalent channel based on the real channel conditions.

It should be noted that modem 130 operates in two modes, namely, a training mode and an operation mode (steady state). When modem 130 is initialized, the training mode, including a channel equalization process, discussed below in a section entitled EQUALIZER TRAINING, and a "level learning" process, discussed below in a section entitled LEVEL LEARNING, is initiated using switch 146 (FIG. 2) set at the second position. Otherwise, in the operation mode, which is the mode shown in FIG. 2, switch 146 is set at a first position to pass the output of feed-forward filter 143 to a subtracter 147. This subtracter 147 subtracts, from the received output, the output of feedback filter 145. The resulting difference, denoted r' (n), is provided to decision circuitry 149. Decision circuitry 149 determines what the most likely transmitted PCM words, r(n), are based on a signal level conversion tables, taking into account line impairments including the digital loss. The decisions from circuitry 149 are provided as an input to feedback filter 145, and are also provided as an input to subtracter 151. Using r' (n) as another input, subtracter 151 evaluates an error signal err(n) as follows:

$$err(n) = r(n) - r'(n) = P^T(n)R(n) - C^T(n)X(n)$$

$$C(n) = C(n-1) + 2\alpha err(n)X(n)$$

where, $$P^T(n) = [P_{K-1}(n)P_{K-2}(n) \ldots p_1(n)p_0(n)]$$

$$C^T(n) = [c_{N-1}(n)c_{N-2}(n) \ldots c_1(n)c_0(n)]$$

$$R^T(n) = [r(n-(K-1))r(n-(K-2)) \ldots r(n-1)r(n)],$$

and $$X^T(n) = [x(n-(N-1))x(n-(N-2)) \ldots x(n-1)x(n)]$$

In the above equations, $\alpha$ is the step-size of updating the feed-forward filter 143 and it is assumed that $p_0$ equals one. $P_k = \{p_0, p_1, p_2, \ldots, p_{K-1}\}$ is the estimated coefficients of the equivalent channel impulse response and these coefficients can be pre-selected before training the DFE 140 of the channel conditions. In the current operation mode, the error signal err(n) is passed through switch 146, onto the feedforward filter 143 to update its tap coefficients, C(n), above.

Figure 3:
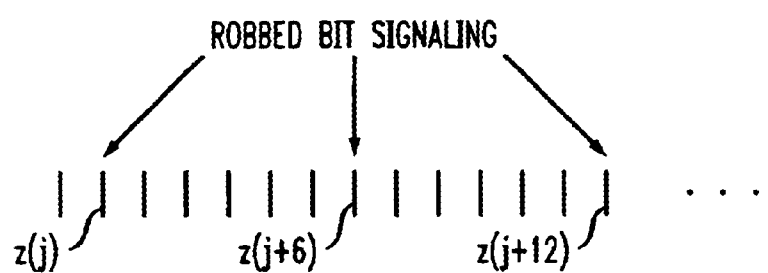
FIG. 3 illustrates the periodicity of robbed bit signaling affecting data symbols transmitted by the modem 105 of FIG. 1.

As previously indicated, PSTN 120 implements robbed bit signaling to indicate call statuses to effect call administration therein. In robbed bit signaling, the central office (not shown) in PSTN 120 robs the LSB of a transmitted symbol on each T1 channel once in every six frames. Thus, as shown in FIG. 3, if the robbed bit signaling affects a $j$-$^{th}$ PCM word (denoted z(j)) transmitted by modem 105 on a channel of T1 line 115, the robbed bit equally affects every $(j+6k)^{th}$ PCM word transmitted thereby, where k is an integer. As each affected PCM word has its LSB substituted by a signaling bit, the loss of the LSB data causes significant degradation to the data transmission. Two types of robbed bit signaling have been identified. A first one is referred to herein as "Type A" robbed bit signaling, and the other is referred to herein as "Type B" robbed bit signaling. In the type A robbed bit signaling, the LSB of the transmitted PCM word is always set to a binary value "1." For example, when modem 105 is used to communicate data represented by a PCM word "4F" (in hexadecimal) to modem 130, the transmitter of modem 105 transmits onto line 115 its $\mu$-law value, "B0," which is the complement of "4F" in accordance with the $\mu$-law companding technique. Implementing the type A robbed bit signaling, an intermediate central office in PSTN 120 transforms the transmitted word "B0" to "B1." The transformed word would be converted by a $\mu$-law codec in a central office close to modem 130 to an analog signal. Assuming no channel imperfection, A/D converter 135 in modem 130 would convert the analog signal to a digital representation of "4E," which is the complement of "B1." Thus, because of the type A robbed bit signaling, the PCM word "4F" communicated by modem 105 becomes "4E" when received at modem 130. However, it should be noted that the type A robbed bit signaling has no effect on communicated words whose LSB's equal "0", such as "4E."

On the other hand, when a transmitted PCM word affected by the type B robbed bit signaling is converted to an analog signal on analog loop 125, the signal level takes on an average value between that representing the PCM word having the LSB equal to "1" and that representing the PCM word having the LSB equal to "0." Thus, because of the type B robbed bit signaling, when the communicated word is "4E" or "4F," assuming no channel imperfection, A/D converter 135 would covert the communicated word to "4E" about half the times and "4F" the other half.

Again, while the above-described robbed bit substitution does not cause significant distortion in voice communications, it causes significant degradation in data communications because of the loss of transmitted bits occasioned thereby. Similarly, while the above digital loss helps reduce the far echo interference in voice communications, it causes the levels of transmitted data signals to be attenuated, resulting in erroneous data recovery in data communications if the digital loss is not taken into account in the PCM modem 130. Although the digital loss is built into each central office switch and the underlying attenuation factor is invariant as far as a given switch is concerned, this factor may vary from one switch to another depending on the type and manufacturer of the switch. As a result, a PCM modem which is pre-adjusted during manufacture thereof to allow for the digital loss by a particular switch may not function properly when connected to a different switch in the field.

A signal level conversion table is generated using the level learning process described below. This table contains (a) each allowable transmitted PCM word from modem 105 that is affected by, among other things, the digital loss imposed by the central office switch, and (b) the received signal level corresponding thereto. During operation of modem 130, by looking up this conversion table, decision circuitry 149 determines the most likely transmitted PCM word corresponding to the received signal, thereby effectively recovering the underlying transmitted data. Advantageously, with this invention, the actual attenuation factor applied by a switch to a transmitted signal does not need to be known a priori to properly treat the resulting digital loss.

EQUALIZER TRAINING

According to a feature of the present invention, the multi-step equalizer training process includes a fine-tuning step (Step 3 discussed below) that improves the equalizer training and reduces the number of computations that must be performed (MIPS) during the level learning process. In addition, the equalizer training process of the present invention separately updates the feed forward filter (FFF) 143 and the level adapter 161, for improved training of the feed forward filter (FFF) 143.

The equalizer training process will be described as follows. First, the elements of the receiver 130 that are operative during the multi-step equalizer training process are generally discussed in a subsection entitled Training Circuitry. Thereafter, the various steps of the multi-step equalizer training process are separately discussed and the manner in which the various elements of the training circuitry are reconfigured for each step is discussed. A pseudo random equalizer training signal to avoid a DC offset, EQTR(n), is used to train the feed forward filter (FFF) 143. The equalizer training signal, EQTR(n), is a two-level PCM code. In the illustrative embodiment, the amplitude of the two-level PCM code for the EQTR(n) signal is selected to be Ucode equal to 79 (decimal). As discussed below, the amplitude of Ucode 79 is 3900 (decimal) and the corresponding δ is 128. However, the amplitude of the two-level PCM code for the EQTR(n) signal can be selected by another two-level Ucode for a different equalizer to get better performance. Of course, the values of their amplitude and δ will be different for a different Ucode. The selected Ucode must satisfy the restrictions of transmitted power. It is noted that there is no zero insertion for the equalizer training signal, EQTR(n).

Training Circuitry

Referring to FIG. 2, during the equalizer training process, the equalizer training signal EQTR(n) is applied to delay element 156 in modem 130. It is noted that during equalizer training the signal EQTR(n) is a two-level random signal. Element 156 imposes a delay to the input sequence to synchronize the operations of various elements in training circuitry 153. Modulo partial response filter 159 processes the EQTR(n) sequence according to the following expression:

$$s_i(n) = \sum_{m=0}^{\frac{K-mod6[K]}{6}} p_{mod6(n-i)} EQTR(n - mod6[n-i] - 6m),$$

where i=0, 1, . . . , 5; mod 6 [*] denotes a standard modulo 6 operation on the argument "*". The output of filter 159, denoted vector S(n), is provided to level adapter 161, where $S^T(n)=[s_0(n) s_1(n) s_2(n) s_3(n) s_4(n) s_5(n)]$. Based on S(n) and another input err(n) to be described, level adapter 161 provides weighting factors, denoted $h_i(n)$ to modulo signal adjuster 163, where i=0, 1, 2, ..., 5. The manner in which $h_i(n)$'s are derived is described below. Using the received weighting factors and a delayed version of EQTR(n), modulo signal adjuster 163 computes an output q(n) according to the following expression:

$$q(n) = \text{sign}[EQTR(n)](A_{EQRR} + h_{mod6[n]}\delta),$$

where $\text{sign}[\tau] = \begin{cases} +1 & \tau > 0.0 \\ 0 & \tau = 0.0 \\ -1 & \tau > 0.0 \end{cases}$ and $A_{EQTR}$ is the ideal amplitude of EQTR(n) (equal to 3900).

It should be noted that q(n) actually represents the received signal corresponding to transmitted EQTR(n) subject to the digital loss by the central office switch in PSTN 120. The output of the modulo signal adjuster 163, q(n), is provided to the partial response filter stage 180, whose output is applied to subtracter 167. The partial response stage 180 operates like the feedback filter 145 and calculates the $p^T(n)Q(n)$ term utilized in the calculation of the error signal, err(n), discussed below. Subtracter 167 also receives a signal from feed-forward filter 143 through switch 146. This signal is derived by filter 143 from the data transmission by modem 105 based on the EQTR(n) sequence. Subtracter 167 subtracts the level of the output signal of filter 143 from the output of the filter stage 180 to form an error signal err(n).

Based on err(n) and S(n) from modulo partial response filter 159, level adapter 161 updates the weighting factors of the level adapter 161, $h_i(n)$, i=0, 1, ... 5, as follows:

$$H(n) = H(n-1) - 2\beta \cdot \text{err}(n)S(n),$$

where $H^T(n) = [h_0(n)h_1(n)h_2(n)h_3(n)h_4(n)h_5(n)],$ $\text{err}(n) = P^T(n)Q(n) - C^T(n)X(n),$ $L(n) = (1-\lambda)L(n-1) + \lambda H(n),$ $b_i(n) A_{EQTR} + l_i(n)\delta,$ $Q^T(n) = [q(n-(K-1))q(n-(K-2)) \ldots q(n-1)q(n))]$ $L^T(n) = [l_0(n)l_1(n)l_2(n)l_3(n)l_4(n)l_5(n)],$ $B^T(n) = [b_0(n)b_1(n)b_2(n)b_3(n)b_4(n)b_5(n)],$ and $\delta = 128$ for mu-law.

In addition, $\beta$ is the step-size of updating the level adapter, $\lambda$ is the coefficient of the LPF (Low Pass Filter) for H(n) 182. The initial value $L^T(n)$ is [0.0 0.0 0.0 0.0 0.0 0.0] and $B^T(n) = [b_0(n)b_1(n)b_2(n)b_3(n)b_4(n)b_5(n)]$ is the actual amplitude of EQTR(n) equalizer training signal corresponding to the six phases at the receiver.

Equalizer Training Process

Step One: During a first step of the equalizer training process, switch 186 and switch 188 are open, for training of the feed forward filter (FFF) 143 using a two-level signal EQTR(n) having an ideal value. The amplitude of the two-level signal EQTR(n) applied to the feed forward filter (FFF) 143 is the same for all six phases. Step one helps to converge the feed forward filter (FFF) 143 to a certain level.

Step Two: Once the feed forward filter (FFF) 143 reaches a certain convergence, switch 186 and switch 188 are closed during step two of the equalizer training process, to evaluate and update the actual level of the signal EQTR(n) to compensate for the channel. The actual level of the signal EQTR(n) can be different from the ideal signal established during step one because the channel may have a digital loss or a robbed bit condition may have occurred. The level of all six phases is monitored during step two, and the amplitude of each phase is calculated. Again, level adapter 161 updates the weighting factors of the level adapter 161, $h_i(n)$, i=0, 1, ... 5, as follows:

$$H(n) = H(n-1) - 2\beta \cdot \text{err}(n)S(n),$$

The weighting factors are applied to low pass filter 182 during step two and the actual level of the signal EQTR(n), B(n), is calculated at stage 184.

Step Three: Once the actual level of the signal EQTR(n), B(n), has been calculated by stage 184, the actual level of the signal EQTR(n), B(n), is applied to the level adapter 161, and the switches 186 and 188 are opened. Thereafter, the level adapter 161 will not be updated. The feed forward filter (FFF) 143, however, continues to be updated by the error signal err(n). Since the level of the signal EQTR(n) is the actual value, B(n), the performance of the feed forward filter (FFF) 143 is improved, even though robbed bit and digital loss degradations have occurred. Thus, step three trains the feed forward filter (FFF) 143 with the new set of B(n) levels obtained during step two. The final tuning of the feed forward filter (FFF) 143 is performed during step three, with the correct level that is disrupted by the robbed bit signaling.

Once the equalizer training process is complete, the feed forward filter (FFF) 143 is fixed.

LEVEL LEARNING

While the equalizer training process discussed above was performed using a two-level training signal, EQTR(n), the level learning process learns all 256 PCM levels including positive and negative values. Two levels (one PCM code) is learned at each time interval. According to a feature of the present invention, the feed forward filter (FFF) 143 can be fixed during the level learning process, because it is well-trained. Thus, the level learning process is simplified and can be implemented with fewer MIPS. First the level learning process is generally discussed, and thereafter the configuration of the PCM modem 130 during the level learning process is presented.

Level Learning Terminology

During the level learning process, any type A and/or type B robbed bit signaling affecting the data transmission from modem 105 to modem 130, can be identified. Based on the knowledge of any occurrence of the type A and/or type B robbed bit signaling, modem 130 communicates to modem 105 the allowable PCM words which can be transmitted by the transmitter of the PCM modem 105 and properly recovered in modem 130 despite the robbed bit signaling.

In accordance with the level learning process, multiple training sequences of reference signals are transmitted, one by one, from modem 105 to modem 130. Each training sequence TRN is of a predetermined length and includes non-spectrum shaping signals denoted TR(n). Each TRN sequence corresponds to a different possible transmitted signal level $A_g$ in absolute value, where g denotes the PCM word and 00 (hexadecimal) $\leq$ g $\leq$ 7F (hexadecimal) in this instance. This stems from the fact that each PCM word in this instance is eight bits long, with one bit indicating a sign of the transmitted signal level representing the PCM word, and the number of possible transmitted signal levels in absolute value is thus $2^7=128$ (equals 7F in hexadecimal). For example, the transmitted signal level $A_g$ with g=4E (hexadecimal) is 3772 units (Ucode equal to 78 in decimal). Thus, the number of TRN sequences used in the level learning process to create the signal level conversion table is 128, each of which corresponds to a different $A_g$. However, in practice, not every transmitted signal level is employed to transmit data. In that case, the number of TRN sequences used in the level learning process is accordingly reduced. In addition, in order to keep the transmitted power virtually constant during the level learning process, the TRN sequences are transmitted in such an order that those TRN sequences corresponding to relatively high transmitted signal levels alternate with those corresponding to relatively low transmitted signal levels.

Figure 4:
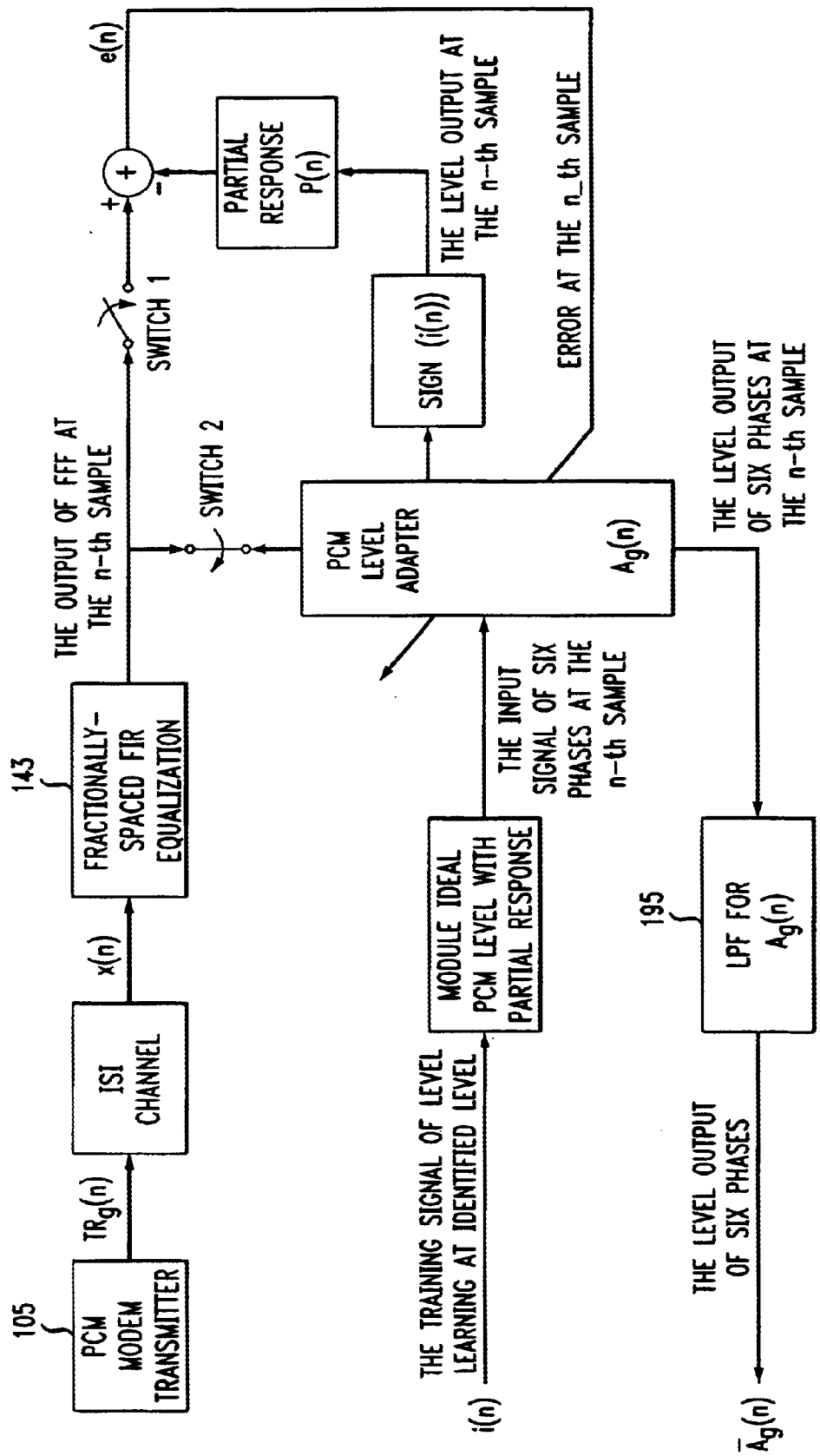
FIG. 4 illustrates. the enhanced level learning with the frozen channel equalizer in accordance with the present invention.

The level learning process takes place after the feed forward filter 143 is trained in the manner described above. The level learning process is initiated by setting switch 146 at the first position to active the feedback filter 145. Thus, during the level learning process, the training circuit 153 is removed from the processing loop entirely. FIG. 4, discussed further below, illustrates configuration of the PCM modem 130 during the level learning of the feed forward filter 143 in accordance with the present invention.

During the level learning process, modem 105 transmits data based on the signals TR(n) in the current TRN sequence used to create the corresponding part of the signal level conversion table in accordance with the invention.

It should be noted that if robbed bit signaling of type A or type B affects a first signal in the TRN sequence, every 6th signal from that first signal in the training sequence would be equally affected. To effectively identify any affected signals, the signals TR(n) in the TRN sequence are divided into six groups, i.e., groups i–0, 1, . . . 5. In this instance, group 0={TR(0) TR(6) TR(12) TR(18) TR(24) . . . }, group 1={TR(1) TR(7) TR(13) TR(19) TR(25) . . . }, group 2={TR(2) TR(8) TR(14) TR(20) TR(26) . . . }, group 3={TR(3) TR(15) TR(21) TR(27) . . . }, group 4={TR(4) TR(10) TR(16) TR(22) TR(28) . . . }, and group 5={TR(5) TR(11) TR(17) TR(23) TR(29) . . . }. If any member of one such group is affected by type A or type B robbed bit signaling, all members in that group are equally affected.

As previously indicated, the training circuitry in FIG. 4 generates the signal level conversion table in accordance with the invention based on $A_g(n)$, which represents the version of TR(n) received at decision circuitry 149, and incorporates the effect of the digital loss caused by the central office switch in PSTN 120. In one implementation, the conversion table contains a row for each PCM code and a column for each of the six frames, i. A table entry in row g and column i represents the average received signal level corresponding to the transmitted signal which represents g and belongs to the group i. The training circuitry in FIG. 4 forms the table entry by: (a) updating the $A_g(n)$ signals corresponding to the non-zero TR(n) signals in group i in the TRN sequence containing $\pm A_g$; and (b) low-pass filtering the updated $A_g(n)$ signals in group i to reduce noise therein. In effect, the table entry represents an average of the updated $A_g(n)$ signals in group i. The conversion table is provided to decision circuitry 149 for the decision circuitry 149 to determine what the most likely transmitted PCM words are, given the received signals, after modem 130 is put in the operation mode. For each received signal corresponding to a group, decision circuitry 149 searches the conversion table for the most likely transmitted PCM word in the column corresponding to that group.

Level Learning Process

A PCM level sent from a transmitter 105 through a digital network 100, can be received at the receiver 130 in different levels in different phases. The robbed bit detection is one way to find the position of a robbed bit signal and then use predetermined tables for each level and phase. The predetermined tables are calculated based on the information of digital loss and the $\mu$ to linear values of the G.711 standard. The predetermined tables do not consider some additional factors, such as channel distortion, channel loss and $\mu$-law to A-law conversion, which may cause some severe degradation of performance. In order to achieve more adaptive and higher performance, the present invention employs a technique of level learning. There are 128 different levels (PCM codes) in a PCM modem, but each level has positive and negative values. Thus, there are 256 $\mu$ values in total. With the training of the channel equalizer previously described, the structure of level learning can be simplified as shown in FIG. 4, where each level will be divided into six phases and processed individually. In other words, the level learning process of the present invention does not utilize the level adapter 161 shown in FIG. 2.

Due to improvements in the training of the channel equalizer 143 provided by the present invention, the channel equalizer 143 will be frozen to evaluate the amplitude of each phase for each PCM code. As indicated above, the 128 PCM codes will be trained in different order to maintain that the average of signal energy is constant. The sequence of training signals will be designed to learn one level at one period of time.

The procedure of level learning to enhance timing recovery for each PCM level is as follows:

Step One: Due to the effect of the robbed bit signal in the network, we may have different values in six phases for each PCM level. The block diagram in FIG. 4 shows that the level value of six phases will be trained and updated in every input sample. The level output of each phase is determined by the exact output of other phases. If noise that occurs in one phase, it can be propagated to the level output of other phases. In order to eliminate the interference between two phases which is caused by the decision feedback equalizer (DFE) 140 and to get the initial value of each phase quickly and accurately, the training signals will be inserted zeroes between two different phases to clear the partial response P(n) in the feedback filter (FBF) (see FIG. 4) for the first non-zero value of each phase. Switch 1 is kept open and switch 2 is closed in FIG. 4 while the first initial value of each phase is estimated.

Step Two: After the initial value of each phase has been obtained, switch 1 is closed and switch 2 is kept open in FIG. 4, and the level value of six phases is updated simultaneously for every input sample.

Step Three: A low pass filter (LPF) 195 is used to reduce the random noise. In order to train the level value of each phase precisely and fast, the initial value of each phase will be value obtained in step one.

Based on this procedure outlined above, it is possible to realize a better training sequence to enhance the performance of level learning. The variable {TRg(n)} is the level training signal of the g-th PCM level. The {TRg(n)} signal is a pseudo-random signal with a constant positive and negative amplitude that is sent from the transmitter 105. In order to avoid the symbol interference caused from the previous training PCM code, the first m training signals {TRg(n)} will be set to zero only in between the first initial value of each phase, where m is on the order of the feedback filter (FBF).

The {TRg(n)} signal sequence is a pseudo-random, non-zero, signal for each PCM level training and this enhances the timing recovery and performance of the level learning process. In the past, zero input training signals have been employed in PCM level training. For more details, see applicant's copending U.S. patent application Ser. No. 09/329,465 entitled "Method and Apparatus for Improved Channel Equalization and Level Learning in a Data Communication System," which is incorporated herein in its entirety by reference. These zero training signals may degrade the timing tone and degrade the accuracy and overall performance of PCM modem communication. In contrast, in this invention, we employ a non-zero, training signal sequence {TRg(n)} for level training. It is then easy for a designer of ordinary skill in the art to generate a training signal sequence {TRg(n)} such that it could generate a strong timing tone at 8 kHz to stabilize the timing recovery during level learning. Stability of timing recovery during level learning helps improve the accuracy and overall performance of PCM modem communication.

The training sequence {TRg(n)} goes through the network communications environment 100 and is disrupted by the channel impairments discussed above. At the receiver 130, the amplitude of the g-th PCM code should appear in a different amplitude in the six phases. Let $A_g(n)$ be the amplitude of the six phases for the g-th PCM level at the n-th sequence, where $(A_g(n))^T=[a_0^g(n)a_1^g(n)a_2^g(n)a_3^g(n)a_4^g(n)a_5^g(n)]$.

From FIG. 4, it follows that:

$$e(n)=P^T(n)Q(n)-C^T(n)X(n),$$

$$q(n)=\text{sign}(i(n))a^i_{mod6[n]}(n)$$

$$A^i(n)=A^i(n-1)-2\zeta e(n)S(n)$$

where $Q^T(n)=[q(n-(K-1))\ q(n-(K-2))\ldots q(n-1)\ q(n)]$ and $\zeta$ is the step-size of updating the PCM level adapter.

A low pass filter (LPF) 195 is used to remove the white random noise and the output of the low pass filter 195 is the levels of six phases that is learned from the channel. Thus, $$\bar{A}_g(n)=(1-\gamma)\bar{A}_g(n-1)+\gamma A_g(n),$$

where $\gamma$ is the coefficient of the low pass filter 195.

The updating equations from FIG. 4 shown above are in generality. Hence, it is not necessary for the training sequence to insert zeroes in the beginning of each phase in a PCM level training. In this invention, it just provides a way to quickly get the six initial values for the six phases of a PCM level by inserting a few zeroes into the training sequence, which doesn't hurt the timing signal design in most cases. If the timing tone design is very critical for some loops, then this invention can also be applied to this case by not inserting zeroes in the training sequence of a PCM level.

It is to be understood that the embodiments and variations shown and described herein are merely illustrative of the principles of this invention and that various modifications may be implemented by those skilled in the art without departing from the scope and spirit of the invention.

For example, the network communications environment 100 disclosed herein uses T1 facilities which are common in the United States. However, the invention is equally applicable in other countries such as European countries where E1 facilities instead of the T1 facilities are used, and where A-law companding instead of $\mu$-law companding controls. Finally, network communications environment 100 disclosed herein is in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. A method for performing level learning with a channel equalizer in a data communication system, comprising the steps of:

training a channel equalizer using a multi-step process to evaluate and update an actual level of an equalizer training signal EQTR(n) to compensate for said channel;

fixing the state of said channel equalizer and a level adapter after said training step; and identifying degradations in a signal in said data communication caused by robbed bit signaling using a level learning sequence, $TR_g(n)$, with non-zero, pseudo-random training signals.

2. The method of claim 1, wherein each level will be divided into six phases corresponding to said robbed bit signaling and processed individually.

3. The method of claim 2, wherein the first m training signals are set to zero during the first initial value of each phase to avoid level interference from two different phases.

4. The method of claim 3, wherein m is the order of the feedback filter used in level earning.

5. The method of claim 2, wherein the initial values for the six phases for each level are estimated by setting the level learning training signals to zero.

6. The method of claim 1, wherein the noise of each phase of one Ucode (one PCM code) is reduced using a low pass filter before said actual level output of six phases in the level learning sequence, $TR_g(n)$.

7. The method of claim 1, wherein circuitry for performing said training step is removed during said level learning process.

8. A method for equalizing a channel and performing level learning with a channel equalizer in a data communication system, comprising the steps of:

training a channel equalizer using a two-level equalizer training signal EQTR(n) having evaluating and updating an actual level of said equalizer training signal EQTR(n) to compensate for said channel;

applying said actual level of the signal EQTR(n) to a level adapter while further updating said channel equalizer;

fixing the state of said channel equalizer and said level adapter after said training step; and identifying degradations in a signal in said data communication caused by robbed bit signaling using a level learning sequence, $TR_g(n)$, with non-zero, pseudo-random training signals.

9. The method of claim 8, wherein said first training step helps to converge the channel equalizer to a certain level.

10. The method of claim 8, wherein said evaluating and updating step is performed once said channel equalizer reaches a certain level of convergence.

11. The method of claim 8, wherein said actual level of the signal EQTR(n) is different from said equalizer training signal EQTR(n) having an ideal value due to a digital loss or a robbed bit condition.

12. The method of claim 8, wherein said evaluating and updating monitors the level of six phases and the amplitude of each phase is calculated.

13. The method of claim 8, wherein the noise of the actual level of the equalizer training signal EQTR(n) is reduced using a low pass filter before said actual level of the equalizer training signal EQTR(n) is calculated.

14. The method of claim 8, wherein each level will be divided into six phases corresponding to said robbed bit signaling and processed individually.

15. The method of claim 14, wherein the first m training signals are set to zero during the first initial value of each phase to avoid level interference from two different phases.

16. The method of claim 14, wherein the initial values for the six phases for each level are estimated by setting the level learning training signals to zero.

17. A system for performing level learning with a channel equalizer in a data communication system, comprising:

a memory for storing computer-readable code; and a processor operatively coupled to said memory, said processor configured to:

train a channel equalizer using a multi-step process to evaluate and update an actual level of an equalizer training signal EQTR(n) to compensate for said channel;

fix the state of said channel equalizer and a level adapter after said training; and identify degradations in a signal in said data communication caused by robbed bit signaling using a level learning sequence, $TR_g(n)$, with non-zero, pseudo-random training signals.

18. The system of claim 17, wherein each level will be divided into six phases corresponding to said robbed bit signaling and processed individually.

19. The system of claim 18, wherein the first m training signals are set to zero during the first initial value of each phase to avoid level interference from two different phases.

20. The system of claim 19, wherein m is the order of the feedback filter used in level learning.

21. The system of claim 18, wherein the initial values for the six phases for each level are estimated by setting the level learning training signals to zero.

22. The system of claim 18, wherein the noise of each phase of one Ucode (one PCM code) is reduced using a low pass filter before said actual level output of six phases in the level learning sequence, $TR_g(n)$.

23. The system of claim 17, wherein circuitry for performing said training is removed during said level learning process.

24. A system for equalizing a channel and for performing level learning with a channel equalizer in a data communication system, comprising:

a memory for storing computer-readable code; and a processor operatively coupled to said memory, said processor configured to:

train a channel equalizer using a two-level equalizer training signal EQTR(n) having an ideal value;

evaluate and update an actual level of said equalizer training signal EQTR(n) to compensate for said channel;

apply said actual level of the signal EQTR(n) to a level adapter while further updating said channel equalizer;

fix the state of said channel equalizer and said level adapter after said training; and identify degradations in a signal in said data communication caused by robbed bit signaling using a level learning sequence, $TR_g(n)$, with non-zero, pseudo-random training signals.

* * * * *